US011322980B2

(12) United States Patent
Eisenhour et al.

(10) Patent No.: US 11,322,980 B2
(45) Date of Patent: May 3, 2022

(54) INDUCTIVE POWER DISTRIBUTION IN A VEHICLE

(71) Applicant: Nissan North America, Inc., Franklin, TN (US)

(72) Inventors: Ronald Eisenhour, West Bloomfield, MI (US); Balkishan Malay Gupta, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 572 days.

(21) Appl. No.: 16/176,994

(22) Filed: Oct. 31, 2018

(65) Prior Publication Data

US 2020/0136433 A1  Apr. 30, 2020

(51) Int. Cl.
| | |
|---|---|
| *H01F 27/42* | (2006.01) |
| *H01F 37/00* | (2006.01) |
| *H01F 38/00* | (2006.01) |
| *H02J 50/10* | (2016.01) |
| *H01F 38/14* | (2006.01) |
| *H02J 50/40* | (2016.01) |
| *B60R 16/023* | (2006.01) |
| *B60R 16/03* | (2006.01) |
| *H02J 50/00* | (2016.01) |

(52) U.S. Cl.
CPC .......... *H02J 50/10* (2016.02); *B60R 16/0238* (2013.01); *B60R 16/03* (2013.01); *H01F 38/14* (2013.01); *H02J 50/005* (2020.01); *H02J 50/40* (2016.02)

(58) Field of Classification Search
CPC .......... H02J 50/005; H02J 50/10; H02J 50/40; H02J 50/402; H01F 38/14; H01F 30/04; B60R 16/0238; B60R 16/03
See application file for complete search history.

(56) References Cited

U.S. PATENT DOCUMENTS

| | | | |
|---|---|---|---|
| 6,409,517 B2 | 6/2002 | Malnati | |
| 6,576,126 B1 * | 6/2003 | Kobayashi | ............... C02F 1/481 210/222 |
| 9,349,531 B2 | 5/2016 | Herglotz et al. | |
| 2006/0279393 A1 * | 12/2006 | Shudarek | .............. H01F 27/263 336/198 |

(Continued)

*Primary Examiner* — Daniel Cavallari
*Assistant Examiner* — Rasem Mourad
(74) *Attorney, Agent, or Firm* — Young Basile Hanlon & MacFarlane, P.C.

(57) ABSTRACT

In one aspect of the present disclosure, an induction hub is disclosed for use in powering components in a vehicle. The induction hub includes a source coil; first and second receiver coils having first and second conductive portions, respectively; and at least one isolation member that is positioned between the first and second conductive portions. The receiver coils are separated from the source coil such that, upon being energized by a power source, the source coil creates an induced electromagnetic field (EMF) and an electrical current in the receiver coils, which are in electrical communication with at least one component in the vehicle to thereby deliver power from the receiver coils to the at least one component. The at least one isolation member includes a material that is electrically nonconductive and electromagnetically permeable so as to physically and electrically separate the receiver coils without impacting the induced EMF.

8 Claims, 15 Drawing Sheets

(56) References Cited

U.S. PATENT DOCUMENTS

| | | | |
|---|---|---|---|
| 2011/0279214 A1* | 11/2011 | Lee | H01F 17/08 336/220 |
| 2012/0235780 A1 | 9/2012 | Maple | H01F 27/2847 336/207 |
| 2013/0314035 A1* | 11/2013 | Kohlschmidt | H02J 7/025 320/108 |
| 2014/0239729 A1* | 8/2014 | Covic | B60L 53/38 307/104 |
| 2015/0210229 A1* | 7/2015 | Milvert | H02J 50/80 307/9.1 |
| 2015/0280447 A1* | 10/2015 | Akuzawa | H01F 38/18 307/104 |
| 2016/0261133 A1* | 9/2016 | Wang | H02J 50/70 |

* cited by examiner

INDUCTIVE POWER DISTRIBUTION IN A VEHICLE

CROSS-REFERENCE TO RELATED APPLICATION(S)

None.

TECHNICAL FIELD

The present disclosure relates generally to vehicles, and, more specifically, to the distribution of inductive power to vehicle components.

BACKGROUND

Conventional vehicles typically include a wiring network to deliver power to their various electrical components, such as, for example, actuators, motors, sensors, heating and cooling devices and systems, lights, display screens, and switches. These wiring networks usually include a complicated arrangement of individual wires, and typically require interface connectors with the individual components as well as wire-to-wire connections (e.g., due to packaging and/or assembly considerations). These connections result in inefficiencies, such as unused connection hardware, as well as increased complexity in not only assembly and maintenance, but system variation (i.e., the addition of a new electrical component or the removal of an existing electrical component).

The present disclosure addresses these issues by proving an inductive power hub that is capable of supporting a robust electrical system in a vehicle without the complexity associated with conventional wiring networks.

SUMMARY

In one aspect of the present disclosure, an induction hub is disclosed for use in powering components in a vehicle. The induction hub includes a source coil; a first receiver coil having a first conductive portion; a second receiver coil having a second conductive portion; and at least one isolation member that is positioned between the first conductive portion of the first receiver coil and the second conductive portion of the second receiver coil. The first and second receiver coils are separated from the source coil such that, upon being energized by a power source, the source coil creates an induced electromagnetic field (EMF) and an electrical current in the first and second receiver coils, which are in electrical communication with at least one component in the vehicle to thereby deliver power from the first and second receiver coils to the at least one component. The at least one isolation member includes a material that is electrically nonconductive and electromagnetically permeable so as to physically and electrically separate the first and second receiver coils without impacting the induced EMF.

In certain embodiments, the first receiver coil may be in electrical communication with a first component in the vehicle, and the second receiver coil may be in electrical communication with a second component in the vehicle.

In certain embodiments, the at least one isolation member may include at least one spacer that is configured as a discrete structure. For example, the at least one spacer may include a first spacer that is positioned between the first and second receiver coils.

In certain embodiments, the first receiver coil, the second receiver coil, and the at least one isolation member may be arranged in a stacked configuration.

In certain embodiments, the induction hub may further include a core that supports the first receiver coil, the second receiver coil, and the at least one isolation member. In such embodiments, it is envisioned that the core may include (e.g., may be formed from) one or more magnetic or non-magnetic materials, and that the core may be either solid or hollow in configuration. For example, the core may include a channel or other such opening that extends therethrough.

In certain embodiments, the induction hub may further include a retainer that is connectable to the core to secure (e.g., fixedly position) the first receiver coil, the second receiver coil, and the at least one isolation member in relation to the core and thereby maintain uniformity in the EMF.

In certain embodiments, the retainer may be configured for removable connection to the core. For example, the retainer and the core may include corresponding threaded portions such that the retainer is threadably engageable with the core.

In certain embodiments, the induction hub may further include a third receiver coil that is in electrical communication with a third component in the vehicle. In such embodiments, the at least one spacer may include a second spacer that is configured as a discrete structure and is positioned between the second receiver coil and the third receiver coil.

In certain embodiments, the first receiver coil may include a first jacket that at least partially covers the first conductive portion, and the second receiver coil may include a second jacket that at least partially covers the second conductive portion.

In another aspect of the present disclosure, an induction hub is disclosed for use in powering components in a vehicle. The induction hub includes a magnetic core; a first receiver coil that is positioned about the magnetic core and in electrical communication with a first component in the vehicle; a second receiver coil that is positioned about the magnetic core and in electrical communication with a second component in the vehicle; a first source coil that is positioned to induce a first electromagnetic field (EMF) and create an electrical current in the first and second receiver coils to thereby power the first and second components in the vehicle; and a first isolation member that is positioned between the first and second receiver coils. The first source coil receives current in a first direction, and the first isolation member includes a material that is electrically nonconductive and electromagnetically permeable so as to physically and electrically separate the first and second receiver coils without impacting the first EMF.

In certain embodiments, the induction hub may further include a first retainer that is connectable to the magnetic core to secure (e.g., fixedly position) the first receiver coil, the second receiver coil, and the first isolation member in relation to the magnetic core and thereby maintain uniformity in the first EMF.

In certain embodiments, the first retainer may be configured for removable connection to the magnetic core. For example, the first retainer and the magnetic core may include corresponding threaded portions such that the first retainer is threadably engageable with the magnetic core.

In certain embodiments, the induction hub may further include a third receiver coil that is positioned about the magnetic core and in electrical communication with a third component in the vehicle; a fourth receiver coil that is positioned about the magnetic core and in electrical communication with a fourth component in the vehicle; a second source coil that is positioned to induce a second electromagnetic field (EMF) and create an electrical current in the third and fourth receiver coils to thereby power the third and fourth components in the vehicle; and a second isolation member that is positioned between the third and fourth receiver coils. The second source coil receives current in a second direction opposite the first direction, and the second isolation member includes a material that is electrically nonconductive and electromagnetically permeable so as to physically and electrically separate the third and fourth receiver coils without impacting the second EMF.

In certain embodiments, the induction hub may further include a second retainer that is removably connectable to the magnetic core to secure (e.g., fixedly position) the third receiver coil, the fourth receiver coil, and the second isolation member in relation to the magnetic core and thereby maintain uniformity in the second EMF.

In another aspect of the present disclosure, a method of delivering power to components in a vehicle is disclosed. The method includes electrically connecting an induction hub to at least one component in the vehicle, and energizing a source coil of the induction hub so as to create an induced electromagnetic field (EMF) and an electrical current in receiver coils. The receiver coils are physically and electrically separated from one another by at least one isolation member, and are in communication with the at least one component in the vehicle to thereby power the at least one component.

In certain embodiments, electrically connecting the induction hub to the at least one component in the vehicle may include electrically connecting a first receiver coil to a first component in the vehicle, and electrically connecting a second receiver coil to a second component in the vehicle. In such embodiments, the at least one isolation member physically and electrically separates the first and second receiver coils without impacting the induced EMF, and is positioned between the first and second receiver coils. For example, the at least one isolation member may include a material that is electrically nonconductive and electromagnetically permeable.

In certain embodiments, the method may further include adding a third receiver coil to the induction hub, and electrically connecting the third receiver coil to a third component in the vehicle.

BRIEF DESCRIPTION OF THE DRAWINGS

According to common practice, the various features of the drawings may not be to scale and may be arbitrarily expanded or reduced for clarity.

DETAILED DESCRIPTION

Figure 1:
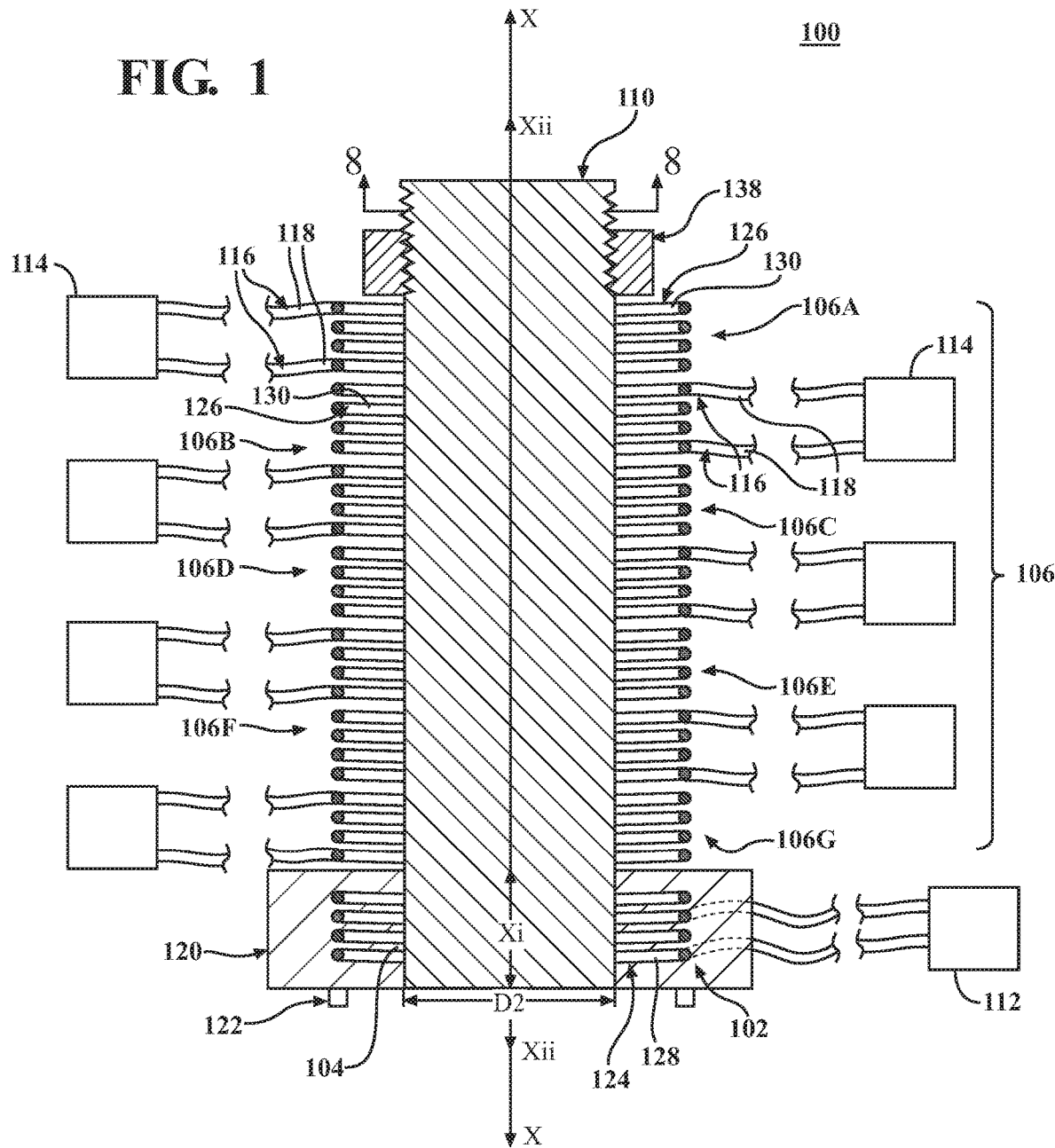
FIG. 1 is a longitudinal, cross-sectional view [DOUBLE CHECK ALL FIGURES] of one embodiment of an induction hub in accordance with the principles of the present disclosure, which includes a source coil and a series of receiver coils that are supported by a core.

The present disclosure describes an induction hub, as well as associated methods of using the induction hub, to deliver power to various electrical components in a vehicle including (but not limited to) actuators, motors, sensors, heating and cooling devices and systems, lights, display screens, and switches. The induction hub includes a source coil and one or more receiver coils that are arranged in a stacked configuration about a core. The stacked configuration of the induction hub allows the number of receiver coils to be easily varied, thereby reducing the complexity conventionally associated with adding or removing electrical components to a wiring network.

Upon being energized (e.g., by an AC power source), the source coil creates an electromagnetic field (EMF) that is induced into the receiver coil(s) via mutual inductance. The induced EMF creates an electrical current in the receiver coil(s), which are connected to the various vehicle components to thereby deliver power by the components. The strength of the induced EMF, and the current created in the receiver coil(s), may be controlled or customized by altering one or more aspects of the induction hub, including, for example, the number of turns in the source and/or receiver coil(s), the spacing between the source coil and the receiver coil(s), the spacing between adjacent receiver coils, the diameters of the source coil and/or the receiver coil(s), the cross-sectional thicknesses of the conductive portions of the source coil and/or the receiver coil(s) (e.g., the diameter of the wires from which the source coil and the receiver coil(s) are formed), the material(s) from which the source coil and the receiver coils are formed, the diameter of the core, whether the core is solid or hollow, and the material(s) from which the core is formed.

To inhibit (if not entirely prevent) unintended conductive contact between the receiver coils, the receiver coils are electrically insulated from one another. For example, the induction hub may include one or more isolation members positioned between the receiver coils that include (e.g., are formed from) one or more electrically nonconductive and electromagnetically permeable materials so as not to interfere with, or otherwise impact, the induced EMF in the receiver coils. It is envisioned that the particular configuration of the isolation member(s) may be varied in alternate embodiments of the disclosure. For example, the isolation member(s) may include one or more individual, discrete structures (members), such as spacers configured as generally annular discs, for example, that are positioned between adjacent receiver coils. Additionally, or alternatively, the isolation member(s) may include, or may be configured as, a jacket, coating, sheath, or other such outer member that covers the conductive portions of the receiver coils.

The isolation member(s) (e.g., the spacer(s)) may also serve to maintain spacing between the receiver coils and/or maintain the orientation of the receiver coils by inhibiting (or entirely preventing) unintended movement of the receiver coils (e.g., tilting), thereby promoting and/or maintaining uniformity in the EMF. To further enhance the stability of the induction hub, the induction hub may include a retainer that is connectable to the core. For example, the retainer and the core may include corresponding threaded portions to allow for simple connection and disconnection of the retainer and the core via threading and unthreading of the retainer.

Figure 2:
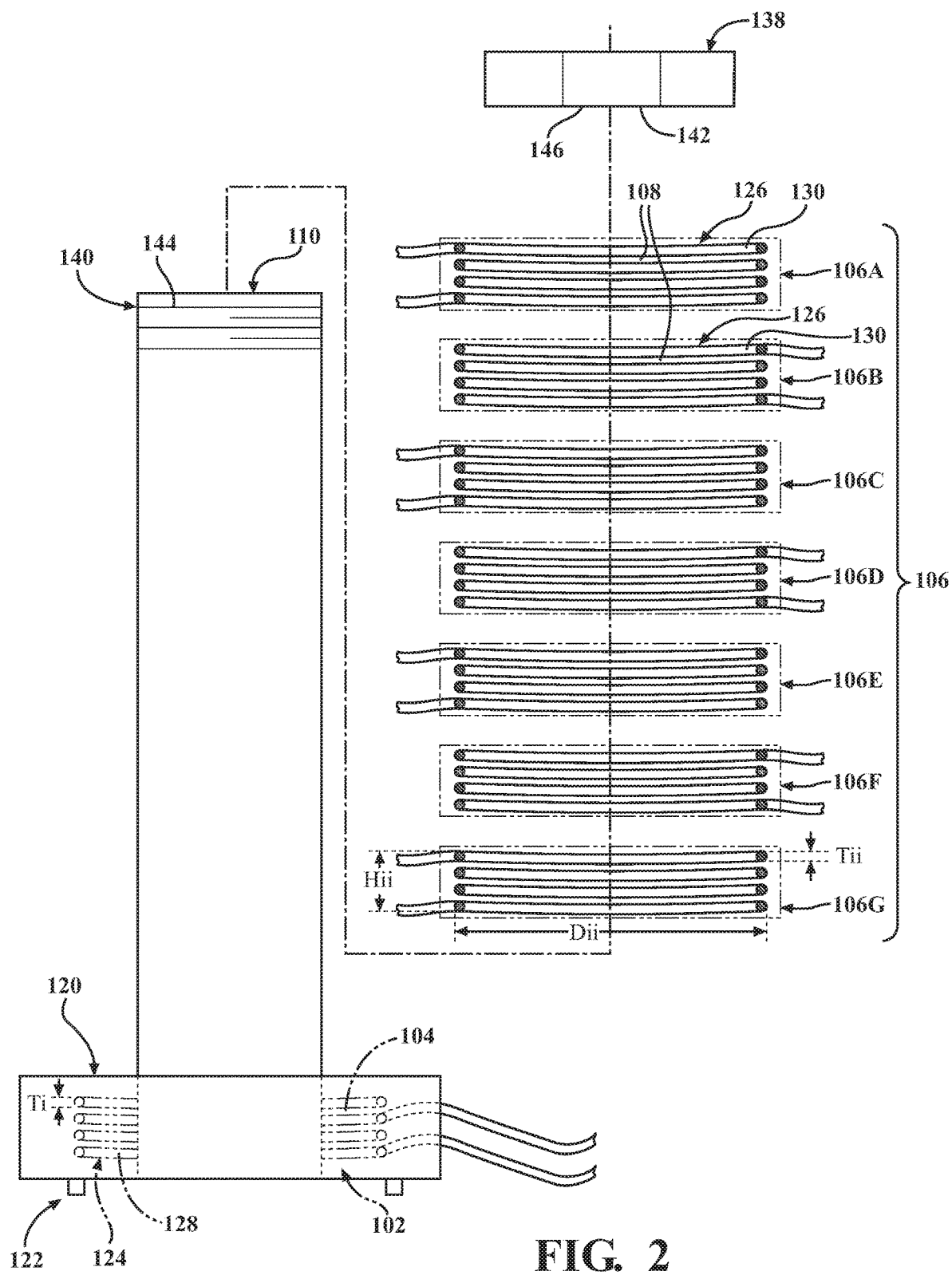
FIG. 2 is a side view of the induction hub seen in FIG. 1 with parts separated.
Figure 3:
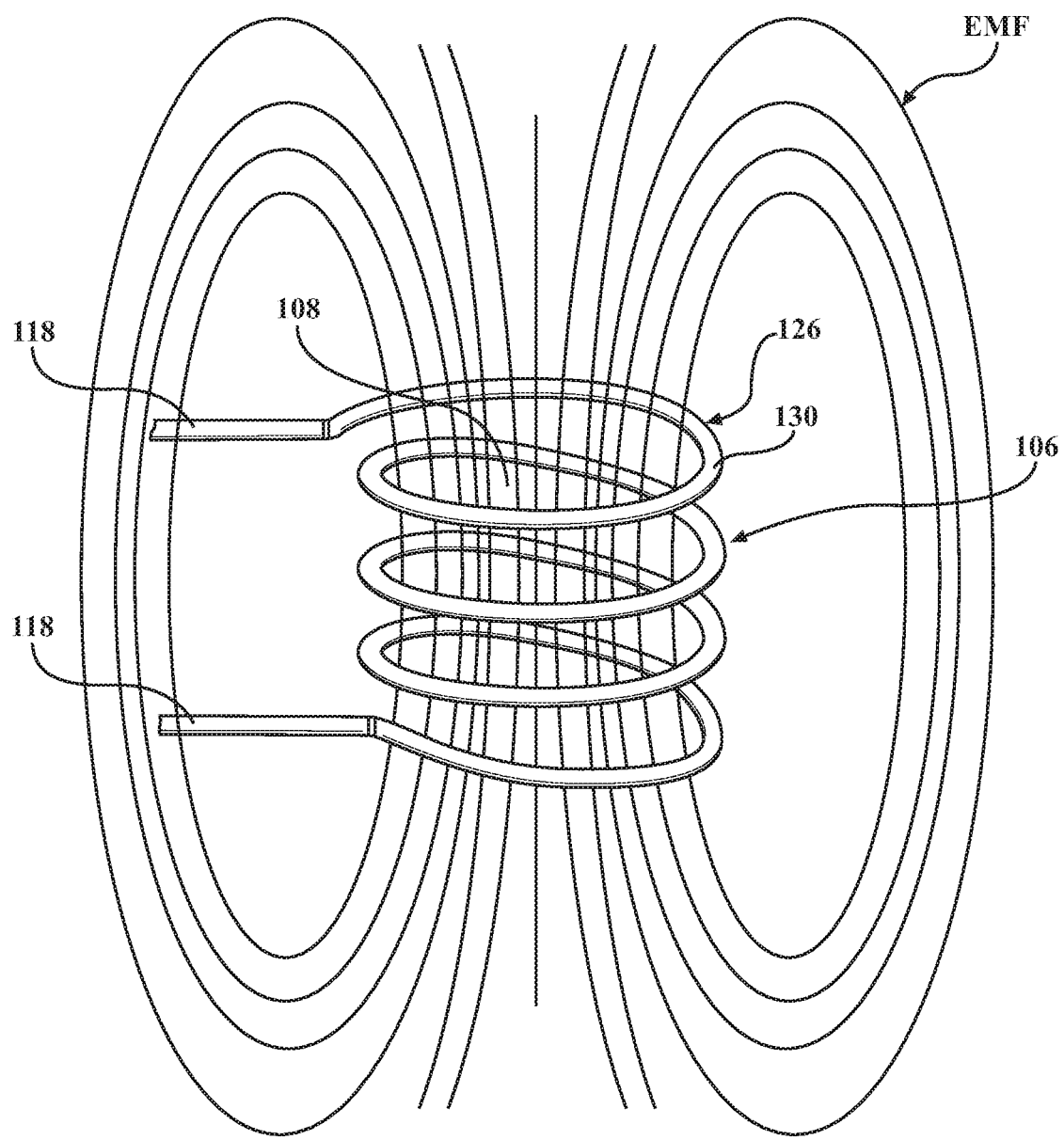
FIG. 3 is a side, perspective view of one of the receiver coils seen in FIG. 1.

FIGS. 1 and 2 illustrate an induction hub 100 for use in powering various components in a vehicle (not shown). The induction hub 100 includes a source coil 102 defining an opening 104 (FIG. 1); one or more receiver coils 106, each defining an opening 108 (FIG. 2); and a core 110 defining a longitudinal axis X. The induction hub 100 is connectable to a power source 112 such that electrical energy can be delivered to the source coil 102 to create an EMF (FIGS. 3, 4) that is wirelessly induced into the receiver coils 106 via mutual inductance. The induced EMF creates an electrical current in each receiver coil 106 that can be used to power various components 114 in the vehicle. It is envisioned that the current in the receiver coils 106 may be communicated to the various components 114 in the vehicle in any suitable manner using any suitable electrical connector(s) 116, such as the wires 118 seen in FIG. 1, for example. To vary the EMF and thereby facilitate the creation of electrical current in the receiver coils 106, it is envisioned that the power source 112 may include an alternating current (AC) power supply in the vehicle, such as the vehicle's alternator, for example.

In certain implementations of the induction hub 100, it is envisioned that each receiver coil 106 may be connected to a different component 114 in the vehicle, as illustrated in FIG. 1. Alternatively, depending upon the power requirements of the various components 114, the capacity of the receiver coils 106, etc., it is envisioned that multiple receiver coils 106 may be connected to a single component 114, and/or that multiple components 114 may be connected to a single receiver coil 106.

As seen in FIGS. 1 and 2, in certain embodiments, the source coil 102 may be housed within a base 120. It is envisioned that the base 120 may be configured and adapted to conceal any conductive surface or portion of the source coil 102 that may otherwise be exposed, and thereby electrically insulate the source coil 102 to inhibit (or entirely prevent) unintended conductive contact. The base 120 may include (e.g., may be formed from) any suitable material or combination of materials that are electrically nonconductive yet electromagnetically permeable so as not to interfere with or otherwise impact the EMF. For example, the base 120 may include (e.g., may be formed from) ABS plastic or other such equivalent material(s). The base 120 may also include an attachment structure 122, which may include any component or mechanism suitable for the intended purpose of facilitating securement of the induction hub 100 to the vehicle in any appropriate or convenient location (e.g., the vehicle dash assembly, the glove box, etc.).

The source coil 102 and the receiver coil(s) 106 include respective conductive portions 124, 126 (e.g., wires 128, 130 or other such suitable members) that define generally helical configurations. More specifically, the source coil 102 is configured such that the conductive portion 124 is wound about an axis Xi, and the receiver coils 106 are configured such that the conductive portions 126 are wound about an axis Xii. As seen in FIG. 1, the source coil 102 and the receiver coil(s) 106 are configured such that, upon assembly of the induction hub 100, the axes Xi, Xii are generally colinear and are oriented in generally parallel relation to the longitudinal axis X of the core 110.

The conductive portions 124, 126 may include (e.g., may be formed from) any suitable electrically conductive material, such as, for example, copper, gold, or silver, and respectively define cross-sectional dimensions (e.g., thicknesses) Ti, Tii (FIG. 2). The conductive portions 124, 126 are wound into the coiled configuration shown throughout the figures such that the coils 102, 106 each define a series of turns, as well as longitudinal dimensions (heights) Hi, Hii and transverse dimensions (widths or diameters) Di, Dii, respectively. By varying one or more of (i) the material(s) from which the conductive portions 124, 126 are formed, (ii) the cross-sectional dimensions Ti, Tii, (iii) the number of turns defined by the coiled configurations of the conductive portions 124, 126, (iv) the heights Hi, Hii, and (v) the transverse dimensions Di, Dii, the electrical and magnetic properties of the source coil 102 and/or the receiver coil(s) 106 can be varied to customize the operability of the induction hub 100 and alter the EMF (FIGS. 3, 4) to achieve any desired result. For example, although the heights Hi, Hii and the transverse dimensions Di, Dii of the coils 102, 106 are illustrated as being approximately equivalent in the embodiments shown throughout the figures, it is envisioned that the induction hub 100 may include coils 102, 106 that vary in their respective heights Hi, Hii and/or transverse dimensions Di, Dii. As seen in FIG. 5, for example, the induction hub 100 may include a first receiver coil 106A having a first height HiiA and a first transverse dimension DiiA, a second receiver coil 106B having a second height HiiB equivalent to the first height HiiA but a different (e.g., smaller) transverse dimension DiiB, and a third receiver coil 106C having a third height HiiC different from the heights HiiA, HiiB and a different (e.g., larger) transverse dimension DiiC.

Figure 6:
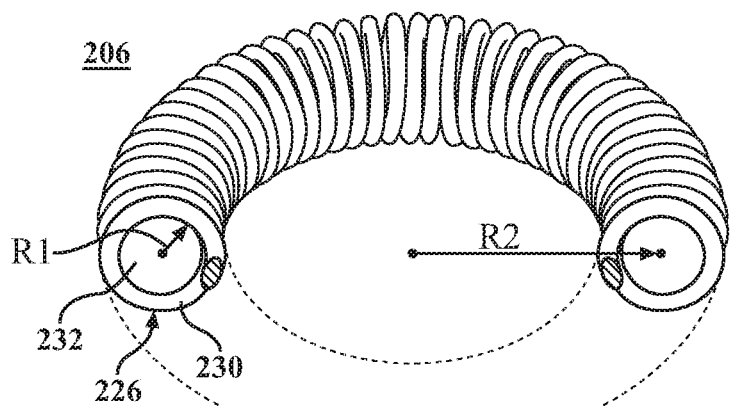
FIG. 6 is a top, perspective view of an alternate embodiment of the receiver coil.
Figure 7:
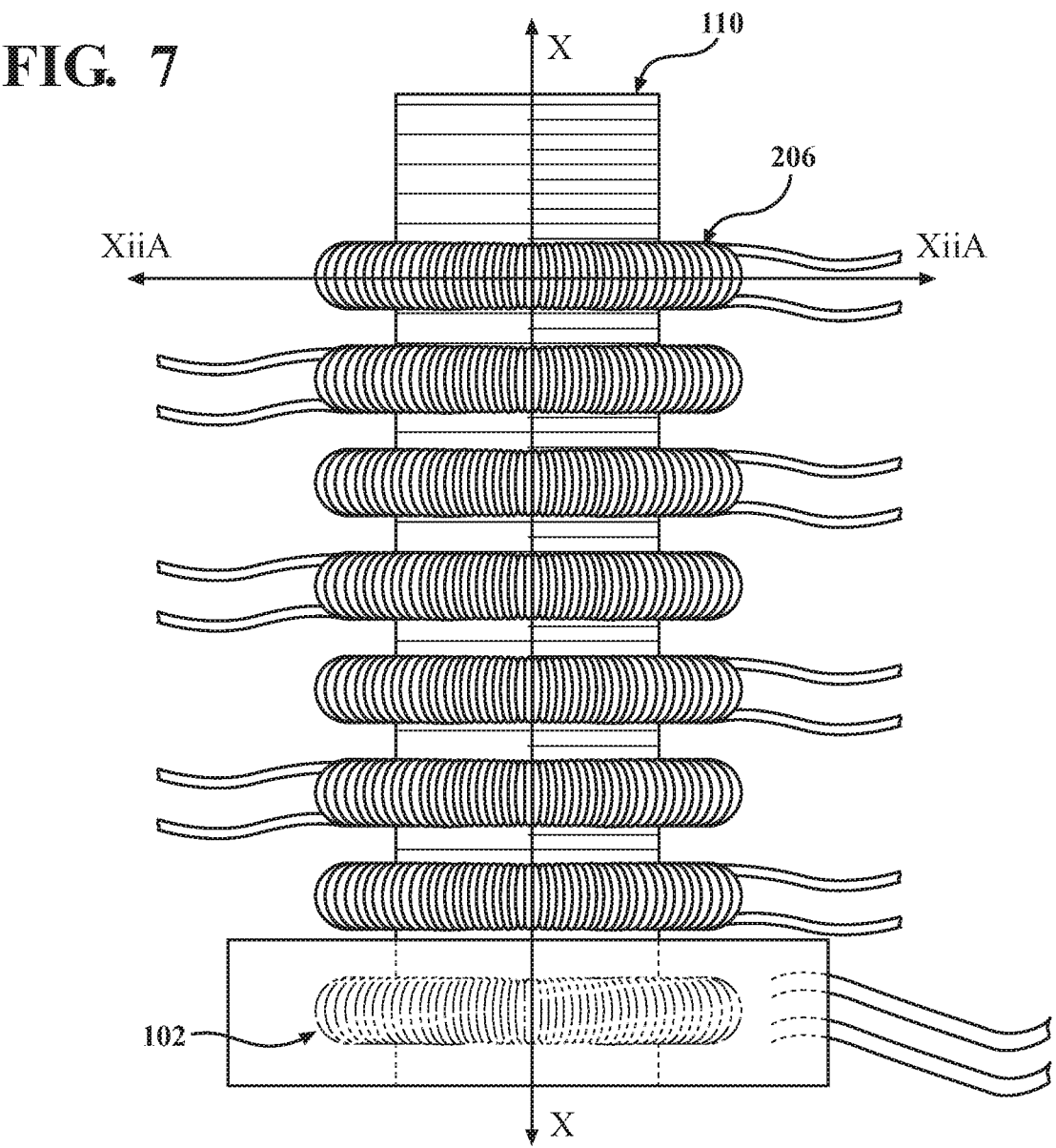
FIG. 7 is a side view of the induction hub including a series of receiver coils according to the embodiment seen in FIG. 6.

FIGS. 6 and 7 illustrate an alternate embodiment of the receiver coil(s), which is identified by the reference character 206. The receiver coils 206 define radial (transverse) dimensions R1, R2, which may be varied in alternate embodiments of the disclosure to influence the EMF that is created upon energizing the source coil 102, and include a toroidal body 232. The toroidal body 232 supports the conductive portion 226 (e.g., the wire 230) such that the conductive portion 226 is wound about an axis XiiA, and may be formed from any suitable material, such as, for example, a magnetic material (e.g., ferrite). In contrast to the embodiment of the receiver coils 106 seen in FIGS. 1-3, for example, as a result of the toroidal configuration of the body 232, the axis XiiA is transverse (e.g., generally orthogonal) in relation to the longitudinal axis X of the core 110, which may function to direct and contain the EMF (FIGS. 3, 4) and/or reduce the presence of stray electromagnetic fields.

With reference again to FIGS. 1 and 2, the core 110 is configured to support the receiver coils 106 in a stacked configuration. More specifically, the core 110 and the receiver coils 106 are configured such that the core 110 is insertable into the opening 108 (FIGS. 2, 3) defined by each receiver coil 106. Although shown as including seven receiver coils 106A-106G in the illustrated embodiment, it should be appreciated that the number of receiver coils 106 may be varied in alternate embodiments of the disclosure (e.g., depending on the number of vehicle components 114 to be powered by the induction hub 100). For example, in certain embodiments, it is envisioned that the induction hub 100 may include a single receiver coil 106 only. The stacked configuration seen in FIGS. 1 and 2 reduces the overall form factor of the induction hub 100, and may facilitate uniformity and consistency in the EMF (FIGS. 3, 4), as discussed in further detail below. The stacked configuration also allows for simple variation in the configuration of the induction hub 100 via the addition and removal of one or more receiver coils 106 to easily increase or decrease the number of components 114 powered by the induction hub 100 and/or the power delivered to the various components 114.

Figure 8:
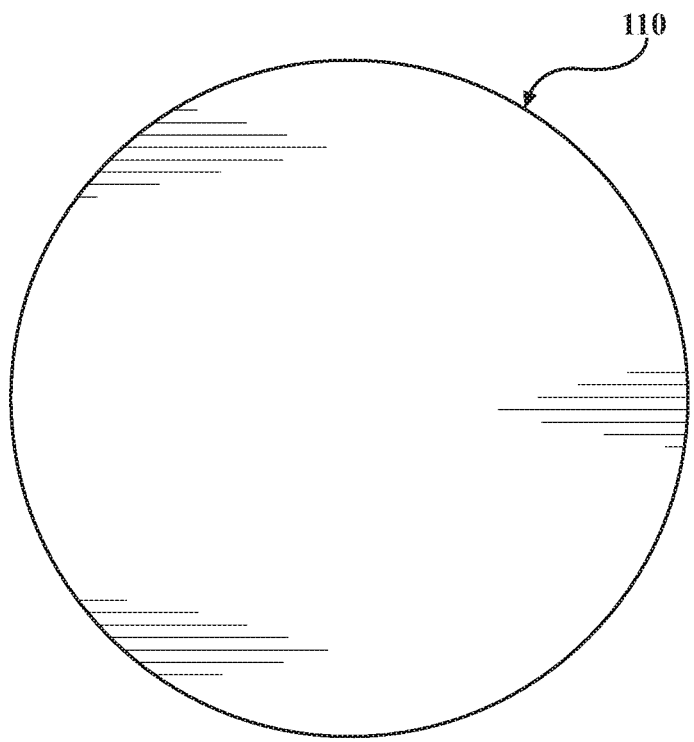
FIG. 8 is a cross-sectional view of the core of the induction hub taken through line 8-8 in FIG. 1.
Figure 9:
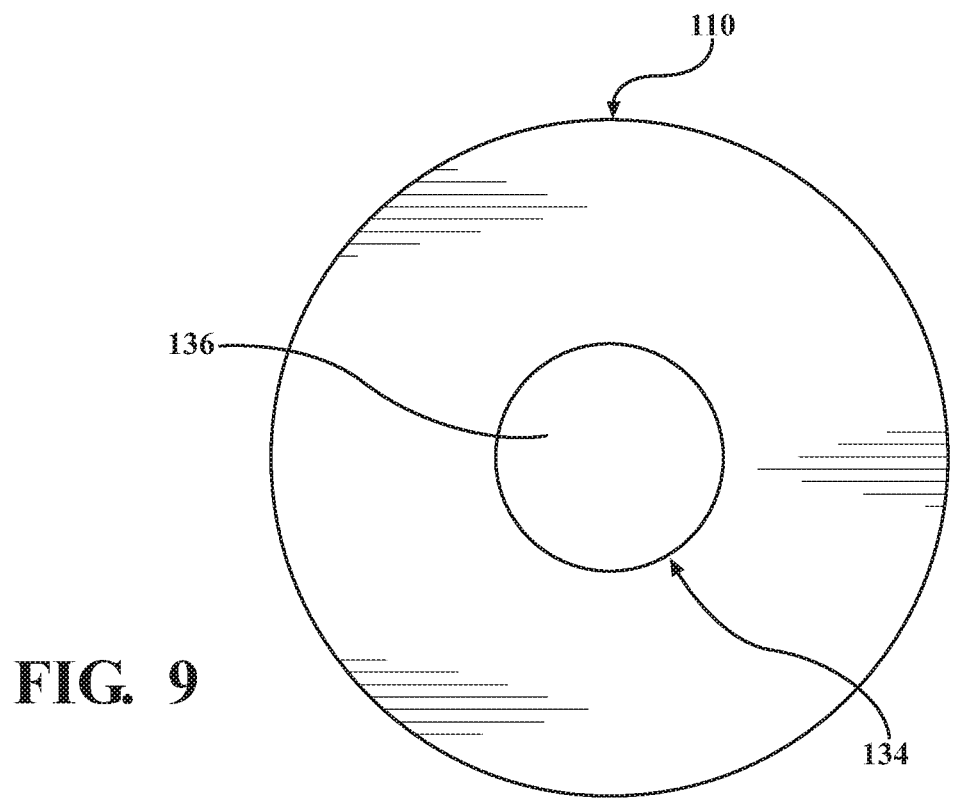
FIG. 9 is a cross-sectional view of an alternate embodiment of the core.

In the illustrated embodiment, the core 110 includes a solid construction, as seen in FIG. 8. It is also envisioned, however, that the core 110 may be hollow. For example, as seen in FIG. 9, the core 110 may include one or more openings 134 (e.g., channels 136 or the like) that extend therethrough. Although shown as including a single, centralized channel 136 in FIG. 9, it should be appreciated that the number and/or orientation of the channels 136 defined by the core 110 may be varied in alternate embodiments of the disclosure.

Figure 4:
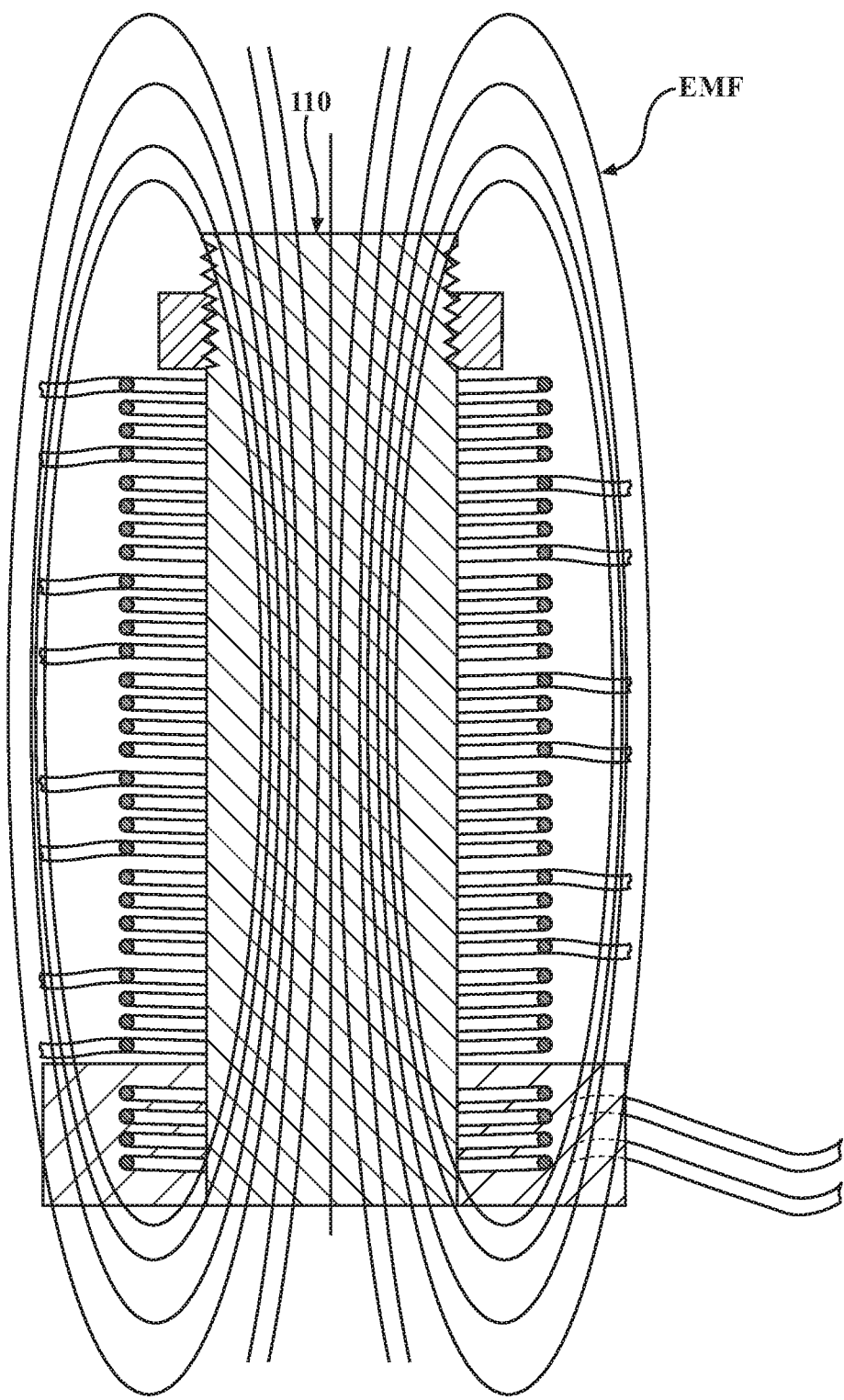
FIG. 4 is a longitudinal, cross-sectional view of the induction hub illustrating an induced EMF in the receiver coils.
Figure 5:
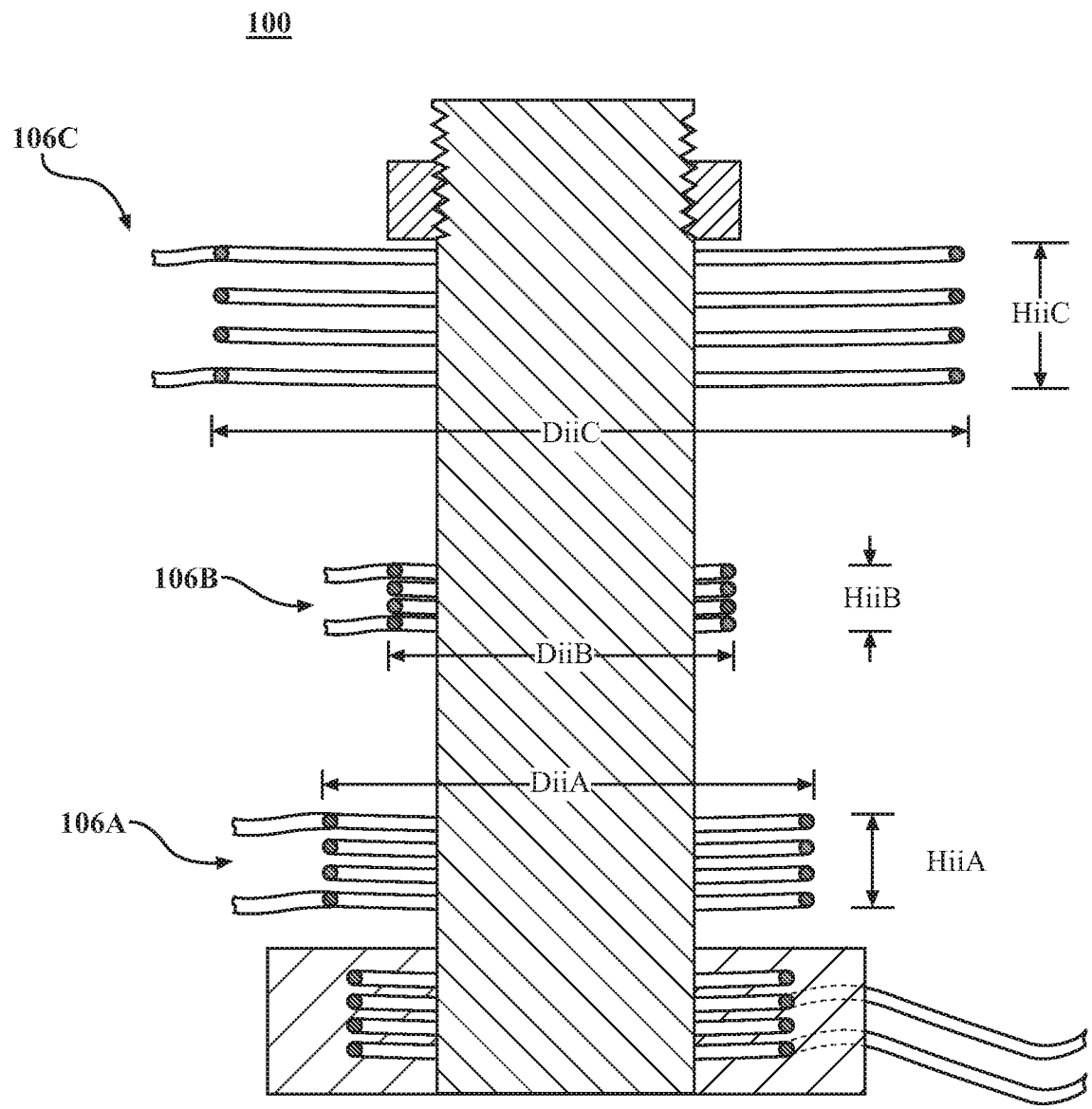
FIG. 5 is a longitudinal, cross-sectional view of the induction hub including receiver coils that vary in dimensions.

As can be appreciated through reference to FIG. 4, the core 110 carries flux of the EMF, which may be varied by altering one or more attributes of the core 110, such as the configuration of the core 110 and/or the material(s) from which the core 110 is formed. For example, it is envisioned that the strength of the EMF may be influenced or customized by varying one or more of the transverse cross-sectional dimension D2 (FIG. 1) of the core 110, the construction of the core 110 (i.e., whether the core 110 is solid or hollow in configuration), and/or the material(s) from which the core 110 is formed. In certain embodiments, for example, it is envisioned that the core 110 may include (e.g., may be formed from) one or more magnetic materials (e.g., ferrite) to increase the strength of the EMF.

In the embodiment seen in FIGS. 1 and 2, for example, the induction hub 100 further includes a retainer 138. The retainer 138 is configured to secure (e.g., fixedly position) the receiver coils 106 in relation to the core 110 in the stacked configuration to reduce (if not entirely prevent) unintended relative movement between the receiver coils 106 to thereby stabilize the induction hub 100 and promote and/or maintain uniformity and consistency in the EMF. The retainer 138 may be formed from any suitable material (e.g., one or more magnetic materials, non-magnetic materials, metallic materials, plastics (such as ABS plastic), polymers, etc.), and may be either fixedly or removably connectable to the core 110. For example, as seen in FIG. 2, the core 110 and the retainer 138 include corresponding mechanical interfaces 140, 142 (e.g., threaded portions 144, 146), respectively. The mechanical interfaces 140, 142 facilitate not only securement of the retainer 138 to the core 110, but variation in the position of the retainer 138 relative to the core 110 (e.g., via rotation of the retainer 138). For example, it is envisioned that the retainer 138 may be positioned so as to apply a compressive force to the receiver coils 106 and thereby lock the receiver coils 106 in place to further proscribe unintended relative movement therebetween and preserve the respective positions of the receiver coils 106.

With reference now to FIGS. 10-16, in certain embodiments, the induction hub 100 may include one or more isolation members 148 to electrically insulate the receiver coils 106 from one another so as to inhibit (if not entirely prevent) unintended electrical (conductive) contact therebetween, as well as unintended electrical (conductive) contact with any other metallic materials (e.g., tools or components of the vehicle). The isolation member(s) 148 may assume a variety of configurations, discussed hereinbelow, and include (e.g., are formed from) one or more materials that are electrically nonconductive yet electromagnetically permeable so as not to interfere with or otherwise impact the induced EMF (FIG. 12) in the receiver coils 106. For example, the isolation member(s) 148 may include (e.g., may be formed from) ABS plastic or other such equivalent material(s).

Figure 10:
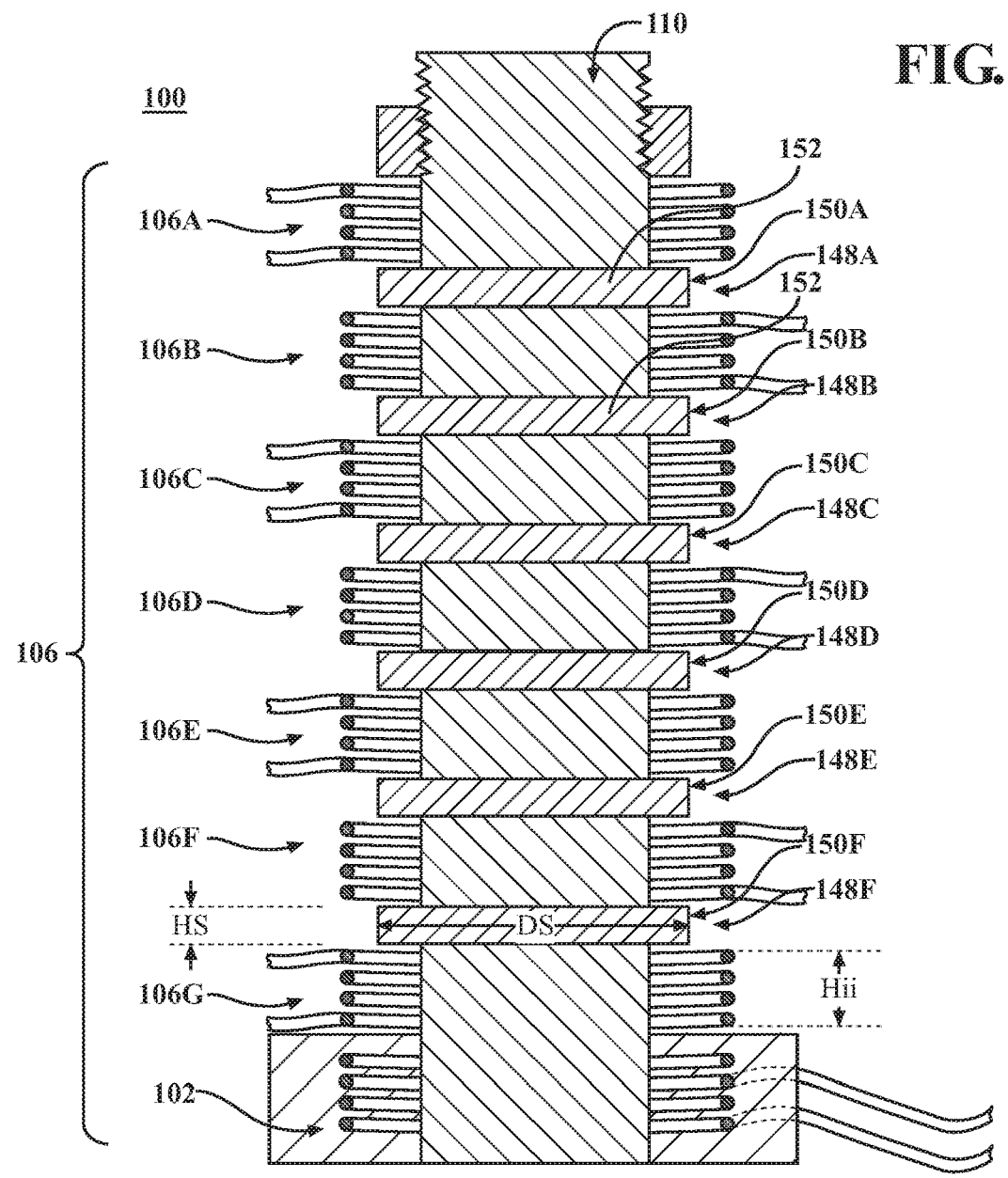
FIG. 10 is a longitudinal, cross-sectional view of the induction hub including a series of isolation members configured as spacers positioned between the receiver coils.
Figure 11:
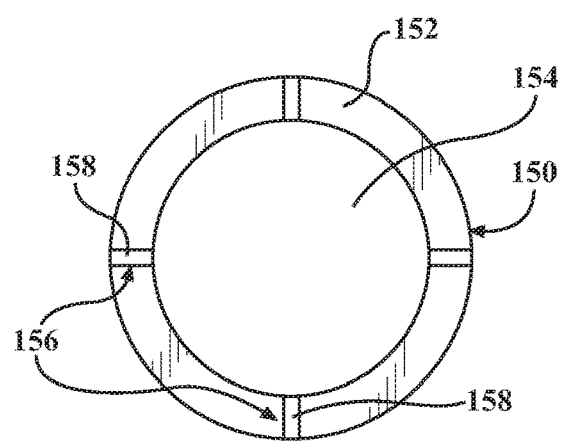
FIG. 11 is a top view of one of the spacers seen in FIG. 10.
Figure 12:
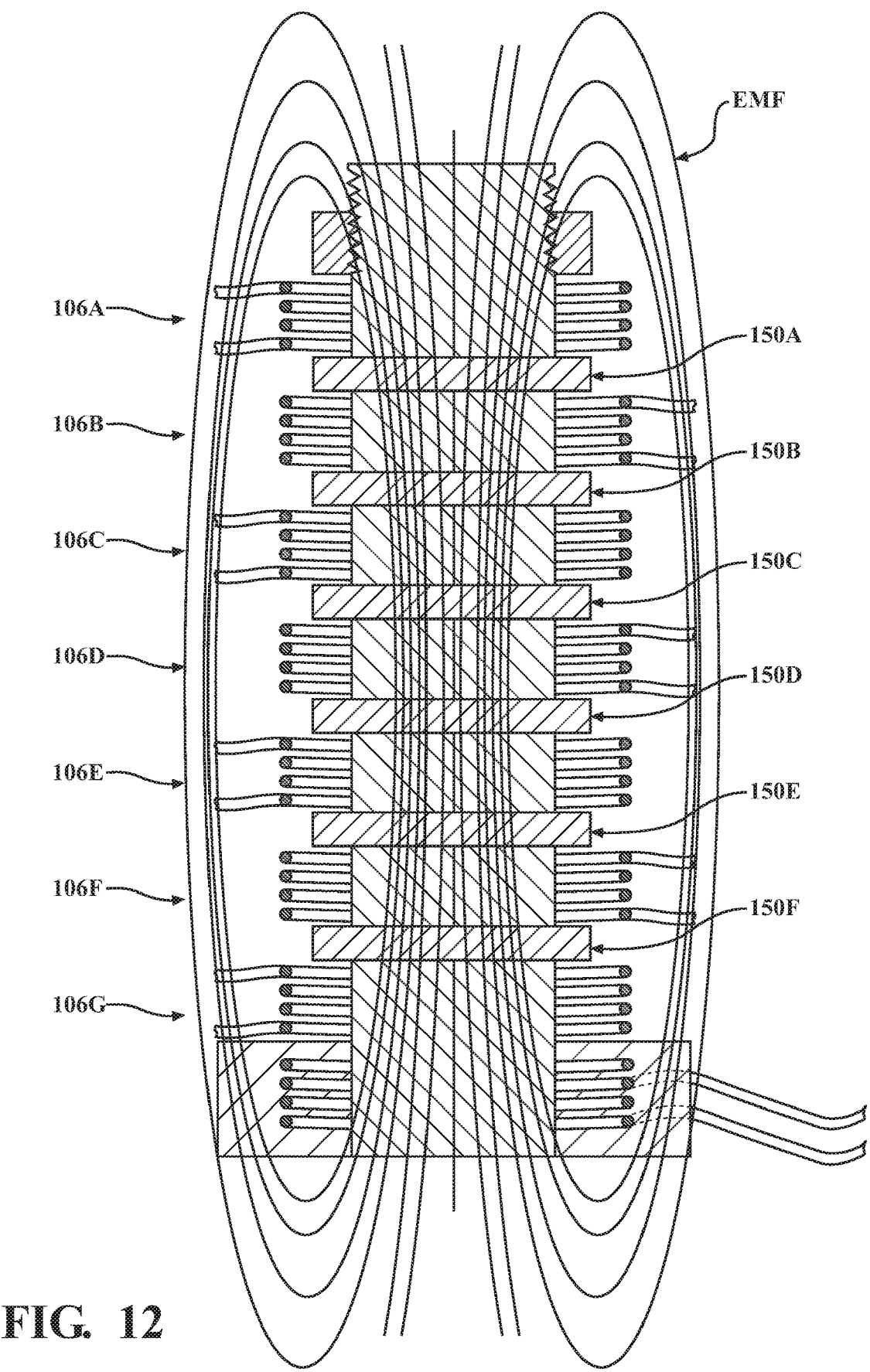
FIG. 12 is a longitudinal, cross-sectional view of the induction hub seen in FIG. 10 illustrating an induced EMF in the receiver coils.

In the embodiment seen in FIGS. 10-12, the induction hub 100 includes a series of isolation members 148A-148F configured as discrete spacer(s) 150A-150F that are positioned between adjacent receiver coils 106 (e.g., the spacer 150A is positioned between the coils 106A, 106B; the spacer 150B is positioned between the coils 106B, 106C; etc.). More specifically, in the embodiment seen in FIGS. 10-12, each spacer 150 is configured as a generally annular disc 152 that defines a transverse dimension (width) DS (FIG. 10) and a longitudinal dimension (height) HS. Although the respective longitudinal dimensions Hii, HS of the receiver coils 106 and the spacers 150 are shown as being unequal, it should be appreciated that, in alternate embodiments of the induction hub 100, the longitudinal dimensions Hii, HS may be equivalent. Additionally, although the longitudinal dimension Hii of each of the receiver coils 106 is illustrated as exceeding the longitudinal dimension HS of each of the spacers 150, in alternate embodiments, the longitudinal dimension HS of one or more of the spacers 150 may exceed the longitudinal dimension Hii of one or more of the receiver coils 106.

The spacers 150 each include an opening 154 that is configured to receive the core 110 such that the spacers 150 are stackable about the core 110 in the same manner as the receiver coils 106. By varying the number of spacers 150 included in the induction hub 100 and/or by varying the longitudinal dimension HS of one or more of the spacers 150, the particular spacing between the receiver coils 106, the spacing between the source coil 102 and the receiver coils 106, and the specific location of the receiver coils 106 along the core 110 can be adjusted (e.g., to vary the strength of the EMF (FIG. 12) and/or the overall performance of the induction hub 100). For example, in certain embodiments of the induction hub 100, it is envisioned that an equal number of spacers 150 may be positioned between adjacent receiver coils 106 such that the spacing between the receiver coils 106 along the core 110 is uniform, as seen in FIGS. 10 and 12. In alternate embodiments, however, the spacing between the receiver coils 106 along the core 110 may be non-uniform. For example, the induction hub 100 may include a single spacer 150 positioned between the receiver coils 106A, 106B and multiple spacers 150 positioned between the receiver coils 106B, 106C, 106D, 106E, each of which may include an identical longitudinal dimension HS, and no spacers 150 between the receiver coils 106F, 106G. To allow for additional variation, it is envisioned that the longitudinal dimension HS of each spacer 150 may vary through the stack. For example, the longitudinal dimension HS of each of the spacers 150C, 150D may exceed the longitudinal dimensions HS of each of the spacers 150A, 150B, 150E, 150F.

In certain embodiments of the induction hub 100, it is envisioned that the particular arrangement (order) of the receiver coils 106 in the stack may be dictated by the priority of the vehicle components 114 (FIG. 1) with which they are associated. For example, higher priority components 114, such as those relating to safety features of the vehicle (e.g., brake lights, seat belts, air bags, etc.), may be positioned so as to receive more reliable current from the induced EMF (FIG. 12). Depending upon the particular configurations of the components of the induction hub 100 (e.g., the source coil 102, the receiver coil(s) 106, the core 110, the isolation member(s) 148, etc.), it is envisioned, for example, that the receiver coils 106 associated with higher priority components may be positioned more centrally along the core 110 than receiver coils 106 associated with other components 114 (e.g., by varying the number of spacers 150, the heights HS of the spacers 150, etc.).

It is also envisioned that the spacer(s) 150 may be configured and utilized to stabilize the induction hub 100 by reducing (if not entirely preventing) unintended relative movement between the receiver coils 106, thereby promoting and/or maintaining uniformity and consistency in the EMF. For example, by increasing the transverse dimension (width) DS of the spacer(s) 150, the spacer(s) 150 may support the receiver coils 106 to reduce (or entirely prevent) tilting, wobbling, or other such movement.

As seen in FIG. 11, it is also envisioned that the receiver coils 106 and spacer(s) 150 may be configured for mating engagement to further restrict relative movement between the receiver coils 106 and the spacer(s) 150 and bring additional stability to the stack. For example, the spacer(s) 150 may include a mating structure 156 (e.g., one or more channels 158) that are configured to receive the conductive portions 126 (e.g., the wires 130) of the receiver coils 106. Additionally, or alternatively, it is envisioned that the mating engagement between the receiver coils 106 and the spacer(s) 150 may facilitate the alignment and assembly of the receiver coils 106 and the spacer(s) 150, as well as the direction (routing) of the electrical connector(s) 116 (e.g., the wires 118) (FIG. 1).

In certain embodiments, it is envisioned that all or some of the receiver coils 106 and the spacer(s) 150 may be fixedly secured together. For example, the receiver coils 106 and the spacer(s) 150 may be laminated together, secured together via an adhesive, or secured together via one or more mechanical fasteners (e.g., pins, dowels, screws, etc.)

Figure 13:
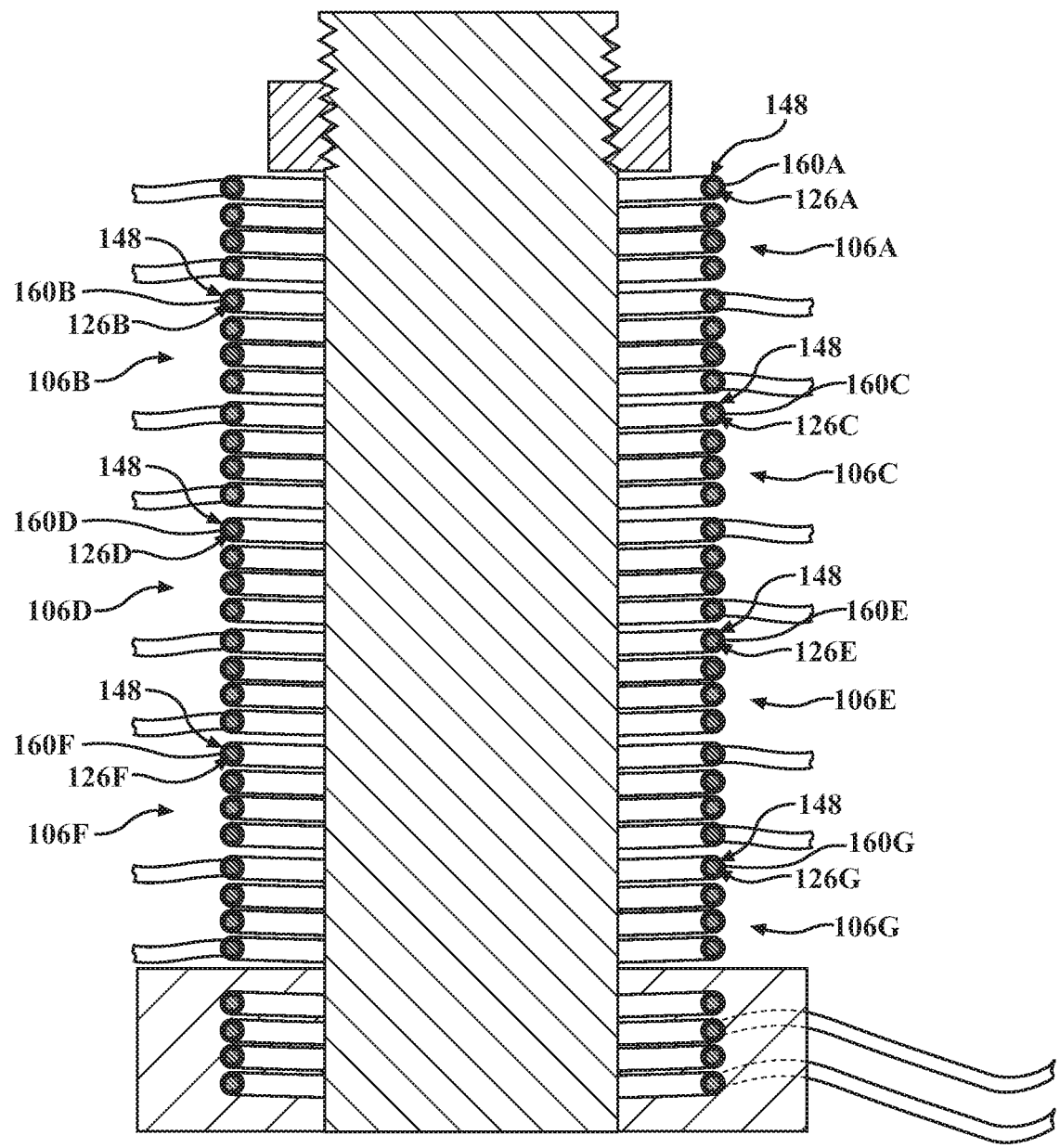
FIG. 13 is a longitudinal, cross-sectional view of the induction hub including a series of isolation members configured as jackets covering conductive portions of the receiver coils.

FIG. 13 illustrates an alternate embodiment of the disclosure in which the isolation member(s) 148 are configured as individual jackets 160 (e.g., a coating, sleeve, sheath, etc.) that partially or entirely cover the conductive portion(s) 126 of the receiver coil(s) 106 so as to physically separate and electrically insulate the receiver coils 106. More specifically, the first receiver coil 106A includes a first jacket 160A covering the conductive portion 126A, the second receiver coil 106B includes a second jacket 160B covering the conductive portion 126B, etc. The jacket(s) 160A-160G may include (e.g., may be formed from) any suitable material (or combination of materials) that is electrically nonconductive yet electromagnetically permeable, as discussed above in connection with the spacers 150 (FIGS. 10-12), and may be applied to the conductive portions 126 in any suitable manner, such as through overmolding, hand-dipping, spraying, etc.

Figure 14:
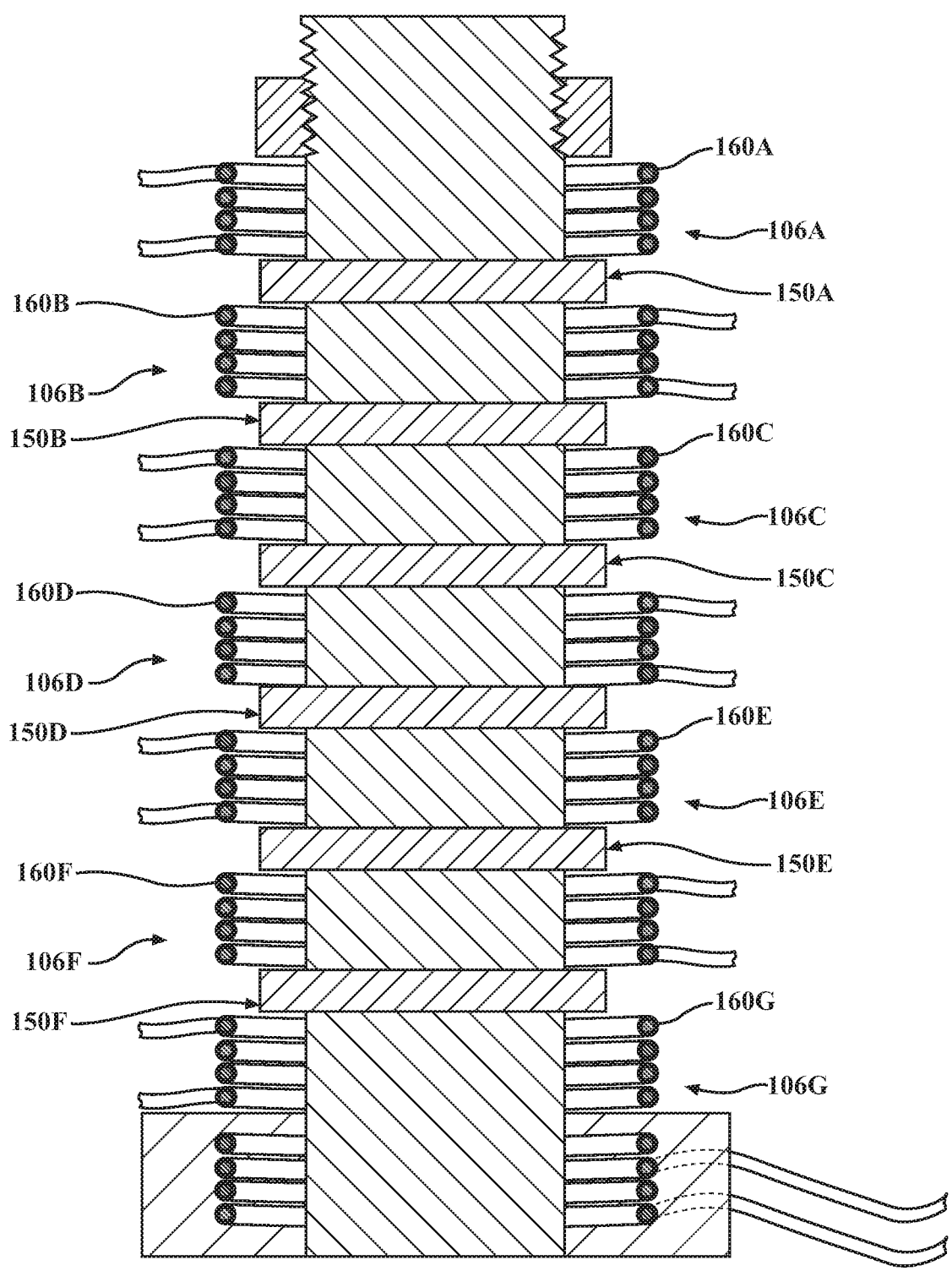
FIG. 14 is a longitudinal, cross-sectional view of the induction hub seen in FIG. 13 including a series of isolation members configured as spacers positioned between the jacketed receiver coils.

FIG. 14 illustrates another embodiment of the disclosure in which the induction hub 100 includes the jacketed receiver coils 106A-106G seen in FIG. 13, as well as one or more spacers 150 (e.g., spacers 150A-150F) that are positioned therebetween. In such embodiments, it is envisioned that the jackets 160A-160G may electrically insulate the receiver coils 106A-106G from one another (e.g., in the event that one or more of the spacers 150A-150F fail, are omitted from assembly, etc.), as well as from any other metallic materials or components of the vehicle.

Figure 15:
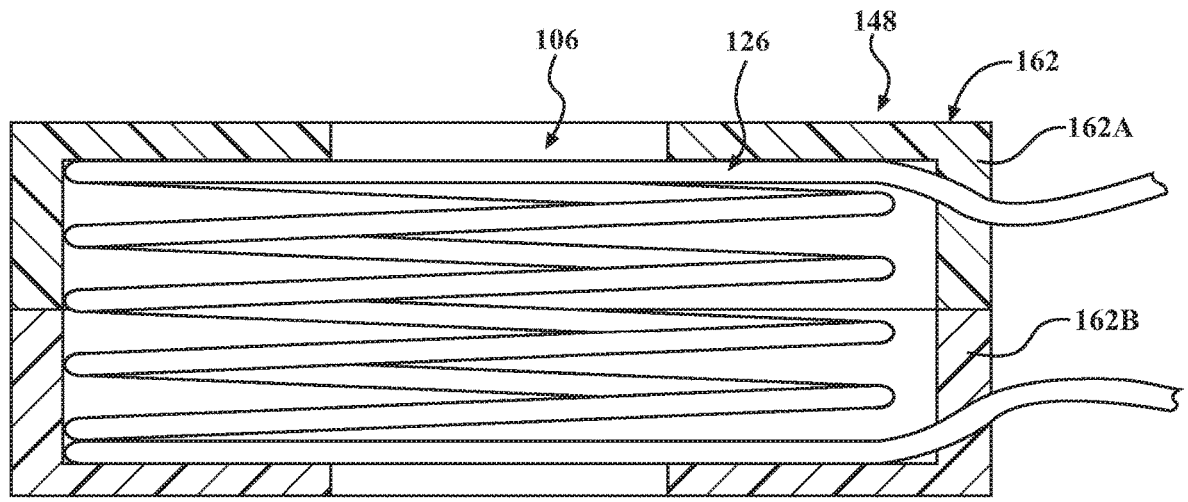
FIG. 15 is a longitudinal, cross-sectional view illustrating a receiver coil accommodated within an isolation member that is configured as a housing.
Figure 16:
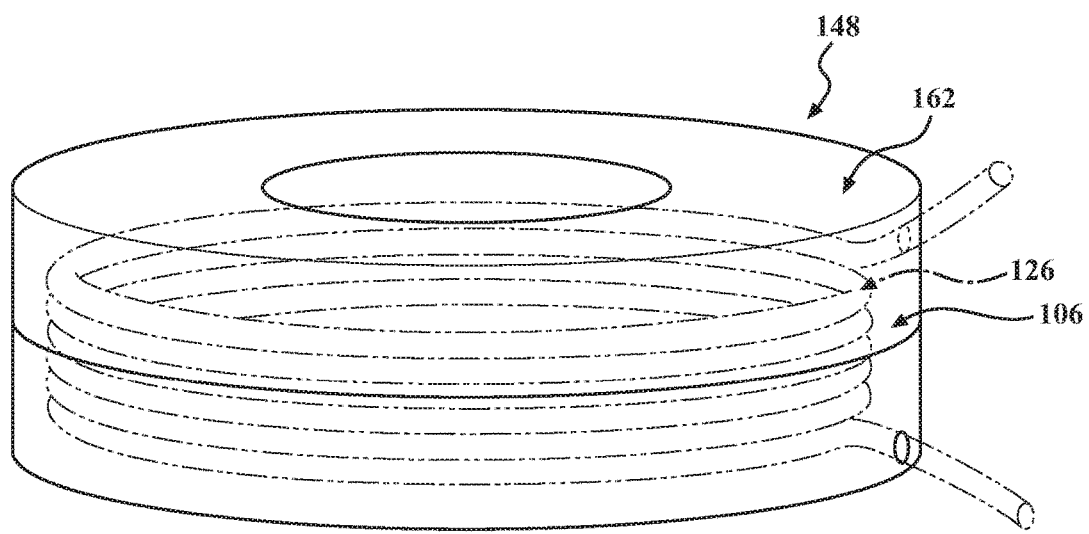
FIG. 16 is a top, perspective view of the receiver coil and the housing seen in FIG. 15.
Figure 17:
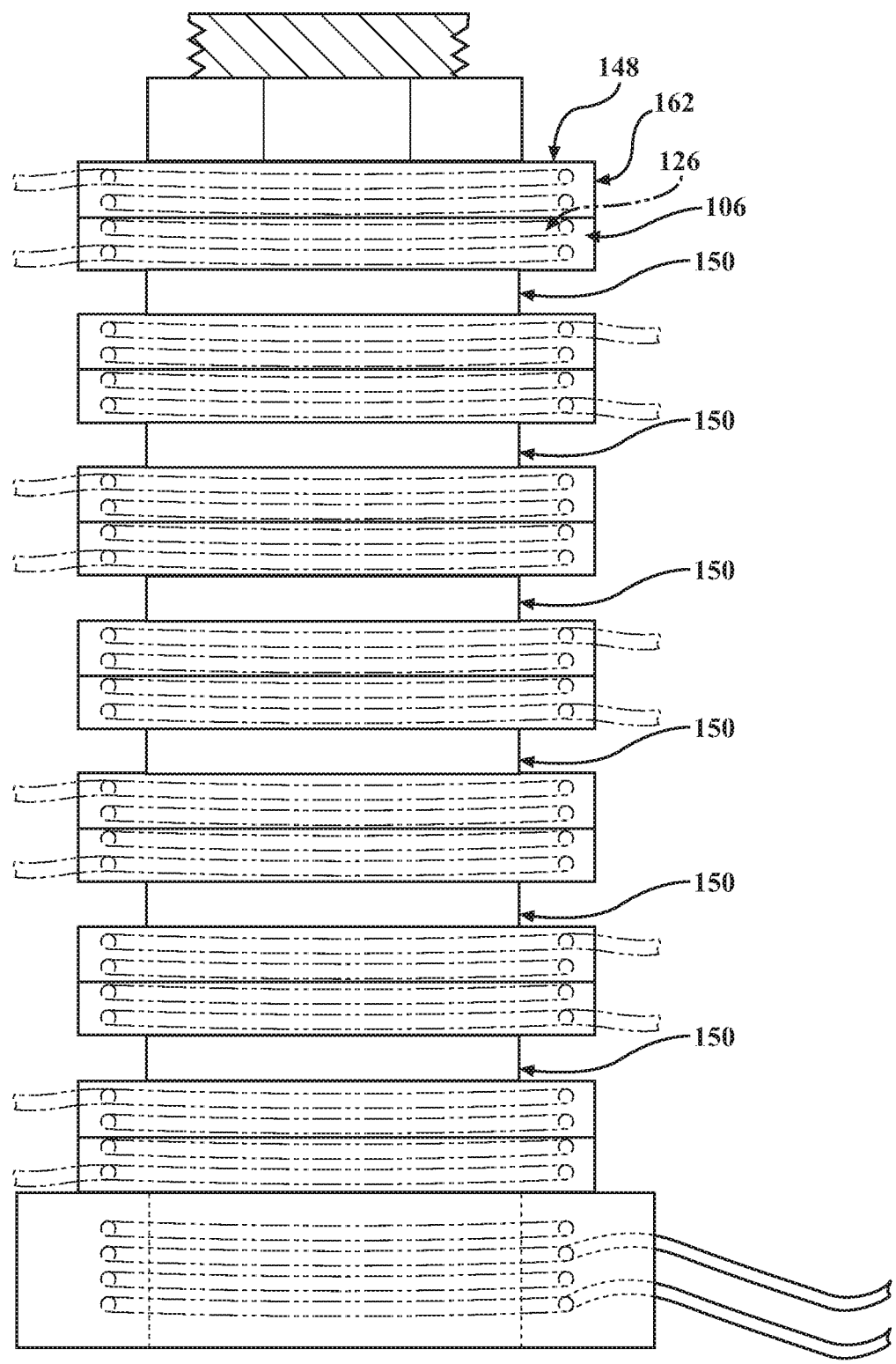
FIG. 17 is a side view of the induction hub including a series of receiver coils and housings according to the embodiment seen in FIGS. 15 and 16.

FIGS. 15-17 illustrate another embodiment in which the isolation members 148 include individual housings 162 that are configured to receive the conductive portions 126 of the receiver coils 106. It is envisioned that that housings 162 may include (e.g., may be formed from) any suitable material (or combination of materials) that is electrically non-conductive yet electromagnetically permeable to thereby electrically insulate adjacent receiver coils 106 from one another (e.g., in the event that the spacers 150 fail, are omitted from assembly, etc.), as well as from any other metallic materials or components of the vehicle. As seen in FIG. 15, each housing 162 may include respective first and second housing portions 162A, 162B, which may be either releasably or fixedly secured together, such as, for example, via one or more mechanical fasteners (e.g., screws or the like), adhesive, etc.

Figure 18:
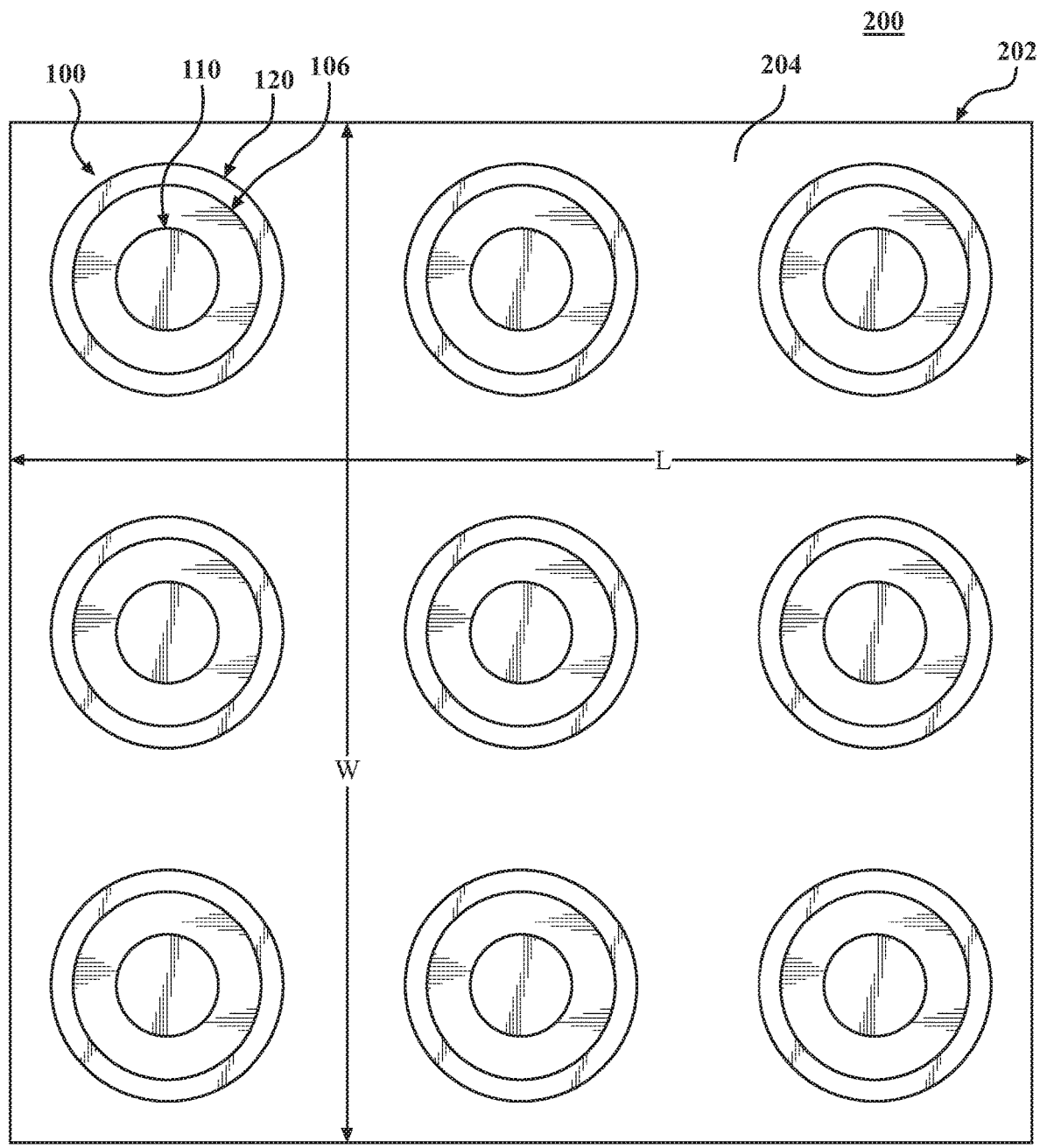
FIG. 18 is a top, plan view of an induction system including a substrate supporting a series of induction hubs.

FIG. 18 illustrates an induction system 200 that includes a series of induction hubs 100, each of which includes a base 120 housing a source coil (not shown), one or more receiver coils 106, and a core 110, as discussed above. Although shown as including nine identical induction hubs 100 in the illustrated embodiment, it should be appreciated that the number of induction hubs 100 and/or the particular configuration of the induction hubs 100 may be varied in alternate embodiments of the induction system 200. For example, depending upon the electrical requirements of the vehicle, it is envisioned that the number of receiver coils 106 included in the individual induction hubs 100 may be varied across the induction system 200.

The induction hubs 100 are connected to a substrate 202 (e.g., a board 204 or other such suitable support) and are separated along the length L and the width W of the substrate 202 (e.g., to reduce, or entirely eliminate, flux and/or EMI between adjacent induction hubs 100). The substrate 202 may be positioned in the vehicle in any suitable location such that the individual induction hubs 100, and the receiver coils 106 included in each induction hub 100, can be connected to a variety of vehicle components 114 (FIG. 1) to deliver power thereto in accordance with the discussion above.

Figure 19:
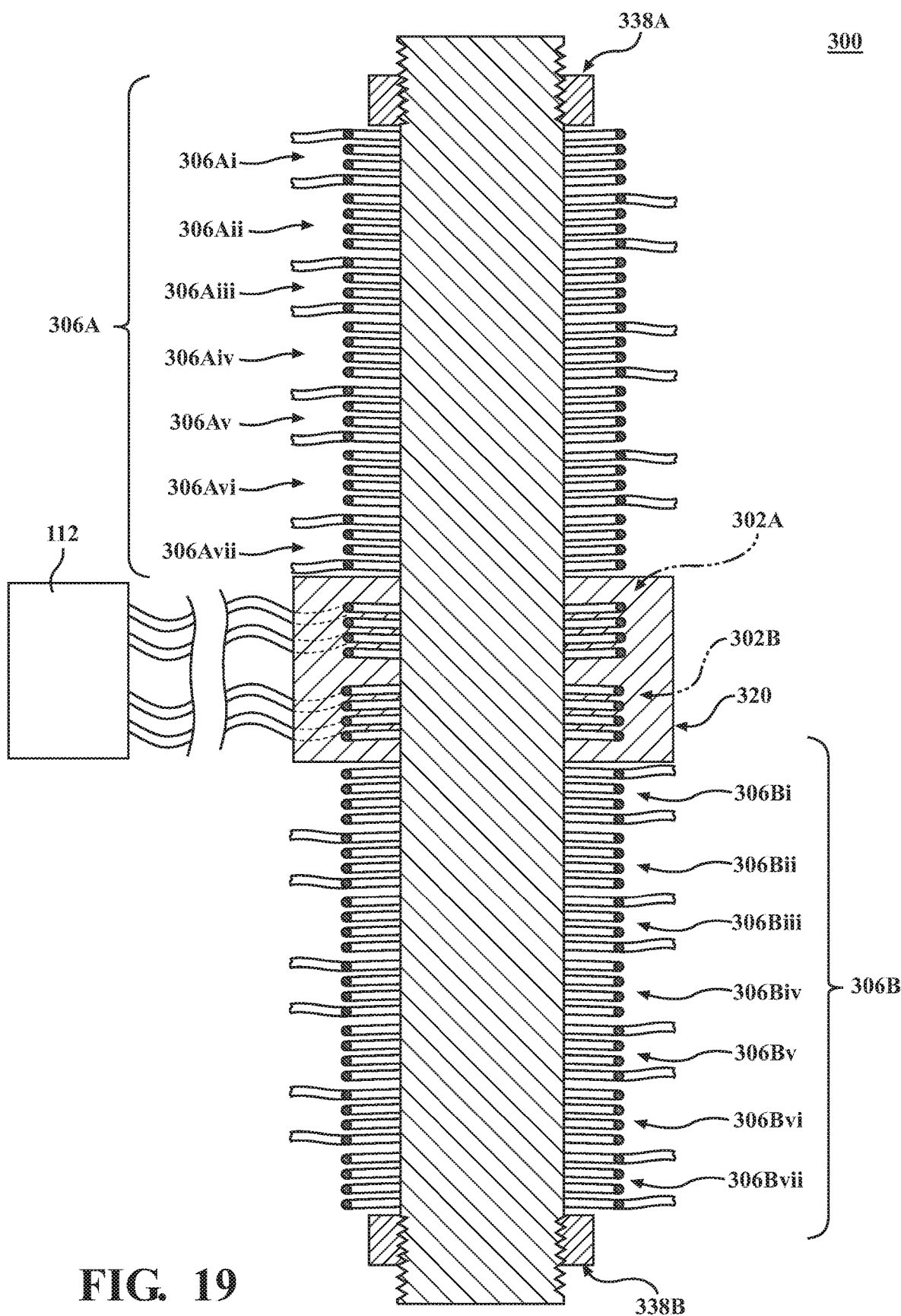
FIG. 19 is a longitudinal, cross-sectional view of an alternate embodiment of the induction hub, which includes a first source coil that induces a first EMF in a first series of receiver coils and a second source coil that induces a second EMF in a second series of receiver coils.

FIG. 19 illustrates an alternate embodiment of the induction hub, which is identified by the reference character 300. The induction hub 300 is substantially similar to the induction hub 100 (FIGS. 1, 2) discussed above, and, accordingly, in the interest of brevity, will be discussed only with respect to any differences therefrom.

The induction hub 300 includes first and second source coils 302A, 302B, respectively, one or more receiver coils 306A, one or more receiver coils 306B, and a (single) core 310 that supports the source coils 302A, 302B and the receiver coils 306A, 306B. Although shown as sharing a common base 320 in the embodiment seen in FIG. 19, in alternate embodiments of the disclosure, it is envisioned that the source coils 302A, 302B may be housed within separate bases configured as discrete structures. Additionally, although shown as including seven receiver coils 306Ai-306Avii and seven receiver coils 306Bi-306Bvii, it should be appreciated that the number of receiver coils 306A, 306B may be varied in alternate embodiments of the disclosure (e.g., depending on the number of vehicle components 114 (FIG. 1) to be powered by the induction hub 300). For example, it is envisioned that the induction hub 300 may include a single receiver coil 306A and a single receiver coil 306B.

The induction hub 300 is connected to the power source 112 such that electrical energy can be delivered to the source coils 302A, 302B to wirelessly create first and second EMFs (not shown) in the receiver coil(s) 306A, 306B, respectively, via mutual inductance. As discussed above, the induced EMFs create an electrical current in each of the receiver coils 306A, 306B that can be transmitted to various components 114 (FIG. 1) in the vehicle. In certain embodiments, it is envisioned that electrical power may be introduced into the source coils 302A, 302B in opposite directions such that the direction of the first EMF opposes that of the second EMF. By creating opposing EMFs, it is envisioned that the magnetic flux created by the source coil 302A may oppose and cancel the magnetic flux created by the source coil 302B such that the net magnetic flux is approximately zero (e.g., at the center of the induction hub 300) and the EMFs created by the source coils 302A, 302B do not interfere with one another.

As seen in FIG. 19, the induction hub 300 may further include respective first and second retainers 338A, 338B to secure and stabilize the receiver coils 306A, 306B. Although shown as being devoid of any isolation members 148, it should be appreciated that the induction hub 300 may include one or more such isolation members 148 in various embodiments of the disclosure. For example, the induction hub 300 may include a series of spacers 150 positioned between the receiver coils 306A and/or the receiver coils 306B to electrically insulate the receiver coils 306A, 306B and/or achieve particular spacing between the receiver coils 306A, 306B to influence the strength of the EMFs and/or the overall performance of the induction hub 300, as discussed in connection with FIGS. 10-12. Additionally, or alternatively, it is envisioned that the receiver coils 306A, 306B may include individual jackets 160 that partially or entirely cover the conductive portions thereof, as discussed in connection with FIG. 13, and/or that the receiver coils 306A, 306B may be accommodated within housings 162, as discussed in connection with FIGS. 15-17.

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure, and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. An induction hub for use in powering components in a vehicle, the induction hub comprising:
   a source coil;
   a first receiver coil having a first conductive portion and a second receiver coil having a second conductive portion, the first and second receiver coils being separated from the source coil such that upon being energized by a power source, the source coil creates an induced electromagnetic field (EMF) and an electrical current in the first and second receiver coils, the first and second receiver coils being in electrical communication with at least one component in the vehicle to thereby deliver power from the first and second receiver coils to the at least one component; and at least one isolation member positioned between the first conductive portion of the first receiver coil and the second conductive portion of the second receiver coil such that the first receiver coil, the at least one isolation member, and the second receiver coil are arranged in a stacked configuration along a longitudinal axis defined by the induction hub, the at least one isolation member including a material that is electrically nonconductive and electromagnetically permeable so as to physically and electrically separate the first and second receiver coils without impacting the induced EMF, wherein:

the first receiver coil is in electrical communication with a first component in the vehicle and the second receiver coil is in electrical communication with a second component in the vehicle, wherein the at least one isolation member includes at least one spacer configured as a discrete structure positioned between the first and second receiver coils, wherein the induction hub further includes:

a magnetic core defining the longitudinal axis and supporting the first receiver coil, the second receiver coil, and the at least one spacer in the stacked configuration; and a retainer connectable to the magnetic core to secure the first receiver coil, the second receiver coil, and the at least one spacer in relation to the magnetic core; and thereby maintain uniformity in the EMF.

2. The induction hub of claim 1, wherein the at least one spacer includes a first spacer positioned between the first receiver coil and the second receiver coil.

3. The induction hub of claim 2, further including a third receiver coil in electrical communication with a third component in the vehicle, the at least one spacer further including a second spacer configured as a discrete structure positioned between the second receiver coil and the third receiver coil.

4. The induction hub of claim 1, wherein the first receiver coil includes a first jacket at least partially covering the first conductive portion and the second receiver coil includes a second jacket at least partially covering the second conductive portion.

5. The induction hub of claim 1, wherein the retainer is configured for removable connection to the magnetic core.

6. The induction hub of claim 5, wherein the retainer and the magnetic core include corresponding threaded portions such that the retainer is threadably engageable with the magnetic core.

7. A method of delivering power to components in a vehicle, the method comprising:

electrically connecting an induction hub to at least one component in the vehicle, the induction hub including a magnetic core defining a longitudinal axis;

energizing a source coil of the induction hub so as to create an induced electromagnetic field (EMF) and an electrical current in receiver coils that are electrically separated from one another by at least one isolation member positioned between the receiver coils and configured as a discrete structure such that the receiver coils and the at least one isolation member are oriented along the longitudinal axis defined by the magnetic core, the receiver coils being in communication with the at least one component in the vehicle to thereby power the at least one component, wherein electrically connecting the induction hub to the at least one component in the vehicle includes electrically connecting a first receiver coil to a first component in the vehicle and electrically connecting a second receiver coil to a second component in the vehicle, wherein the at least one isolation member includes a material that is electrically nonconductive and electromagnetically permeable so as to physically and electrically separate the first and second receiver coils without impacting the induced EMF, wherein the first receiver coil, the second receiver coil, and the at least one isolation member are supported by the magnetic core in a stacked configuration about the longitudinal axis; and connecting a retainer to the magnetic core to secure the first receiver coil, the second receiver coil, and the at least one isolation member in relation to the magnetic core and thereby maintain uniformity in the EMF.

8. The method of claim 7, further including adding a third receiver coil to the induction hub and electrically connecting the third receiver coil to a third component in the vehicle.

* * * * *